United States Patent
Kobayashi et al.

(10) Patent No.: US 8,954,594 B2
(45) Date of Patent: Feb. 10, 2015

(54) COMMUNICATION DEVICE, COMMUNICATION METHOD AND PROGRAM

(75) Inventors: Yoshihiro Kobayashi, Kanagawa (JP); Toru Nagara, Tokyo (JP)

(73) Assignee: Sony Corporation (JP)

( * ) Notice: Subject to any disclaimer, the term of this patent is extended or adjusted under 35 U.S.C. 154(b) by 965 days.

(21) Appl. No.: 12/590,797

(22) Filed: Nov. 13, 2009

(65) Prior Publication Data

US 2010/0146134 A1     Jun. 10, 2010

(30) Foreign Application Priority Data

Dec. 9, 2008   (JP) ................................ 2008-313661

(51) Int. Cl.
| | |
|---|---|
| *G06F 15/167* | (2006.01) |
| *G06F 15/16* | (2006.01) |
| *H04L 12/28* | (2006.01) |
| *G06F 21/60* | (2013.01) |
| *G06F 21/10* | (2013.01) |
| *H04N 21/436* | (2011.01) |
| *H04N 21/4367* | (2011.01) |
| *H04N 21/4405* | (2011.01) |

(52) U.S. Cl.
CPC ............. *G06F 21/606* (2013.01); *G06F 21/10* (2013.01); *H04N 21/43615* (2013.01); *H04N 21/43622* (2013.01); *H04N 21/4367* (2013.01); *H04N 21/4405* (2013.01)
USPC ........... 709/229; 709/212; 709/227; 709/228; 370/395.2

(58) Field of Classification Search
None
See application file for complete search history.

(56) References Cited

U.S. PATENT DOCUMENTS

| | | | | |
|---|---|---|---|---|
| 7,814,542 | B1 * | 10/2010 | Day | ............................... 726/22 |
| 2001/0055982 | A1 * | 12/2001 | Umeda | ........................ 455/560 |
| 2005/0107106 | A1 * | 5/2005 | Valkealahti et al. | .......... 455/522 |
| 2008/0075053 | A1 * | 3/2008 | Soneda | ......................... 370/338 |
| 2009/0010223 | A1 * | 1/2009 | Hirano | .......................... 370/331 |
| 2010/0014463 | A1 * | 1/2010 | Nagai et al. | ................... 370/328 |

FOREIGN PATENT DOCUMENTS

| | | |
|---|---|---|
| JP | 2004048493 A | 2/2004 |
| JP | 2004118327 A | 4/2004 |
| JP | 2005251025 A | 9/2005 |

(Continued)

OTHER PUBLICATIONS

Office Action from Japanese Application No. 2008-313661, dated Oct. 12, 2010.

(Continued)

*Primary Examiner* — Ranodhi Serrao
*Assistant Examiner* — Farrukh Hussain
(74) *Attorney, Agent, or Firm* — Lerner, David, Littenberg, Krumholz & Mentlik, LLP

(57) ABSTRACT

There is provided a communication device, comprising, a communication unit which mediates a communication connection with another communication device, a memory unit which stores connection history information which indicates history of a connection party connected via the communication unit and connection restriction information to limit the number of connection party changes, and a determination unit which determines connection acceptability with a new connection party based on the connection history information and the connection restriction information stored in the memory unit.

4 Claims, 12 Drawing Sheets

(56) References Cited

FOREIGN PATENT DOCUMENTS

| JP | 2006202196 A | 8/2006 |
| JP | 2007-104561 A | 4/2007 |
| WO | 0111819 A1 | 2/2001 |
| WO | 0142886 A2 | 6/2001 |
| WO | 0230054 A1 | 4/2002 |
| WO | 0231630 A2 | 4/2002 |

OTHER PUBLICATIONS

European Search Report, EP 09178403, dated Jul. 19, 2010.

* cited by examiner

FIG.3

CONNECTION HISTORY INFORMATION ~152

| ROW NUMBER | DEVICE ID | DEVICE TYPE | PUBLIC KEY | SECRET KEY | VERSION | REGISTRATION DATE |
|---|---|---|---|---|---|---|
| 1 | SO1000 | LCD | 98765432 | 1357 | HDCP1.0 | 2008/1/10 |
| 2 | SO2000 | OLED | 87654321 | 2468 | HDCP1.1 | 2008/5/5 |
| 3 | NY3000 | PDP | 76543210 | 3579 | HDCP1.2 | 2008/9/1 |

FIG.4

| CONNECTION RESTRICTION INFORMATION | 154 |
|---|---|
| NUMBER OF ALLOWABLE CONNECTIONS | 5 |
| RECONNECTION COUNT-UP | Y |

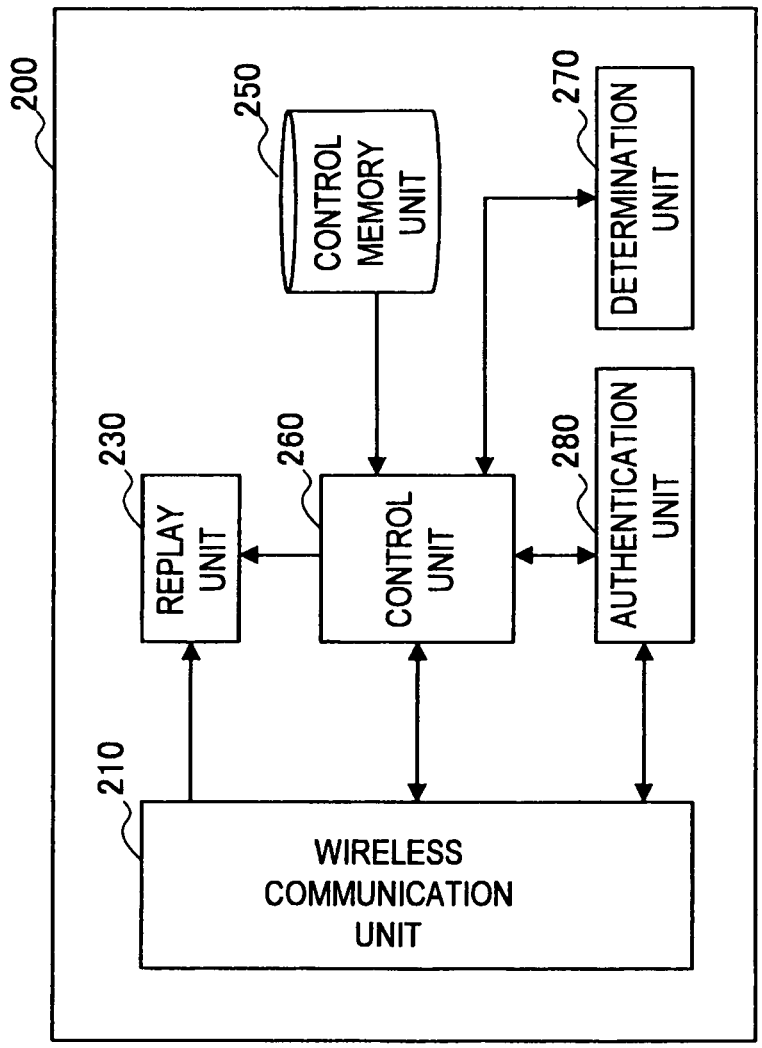
FIG.7

FIG.8

| CONNECTION RESTRICTION INFORMATION | ~254 |
|---|---|
| NUMBER OF ALLOWABLE CONNECTIONS | 5 |
| RECONNECTION COUNT-UP | N |

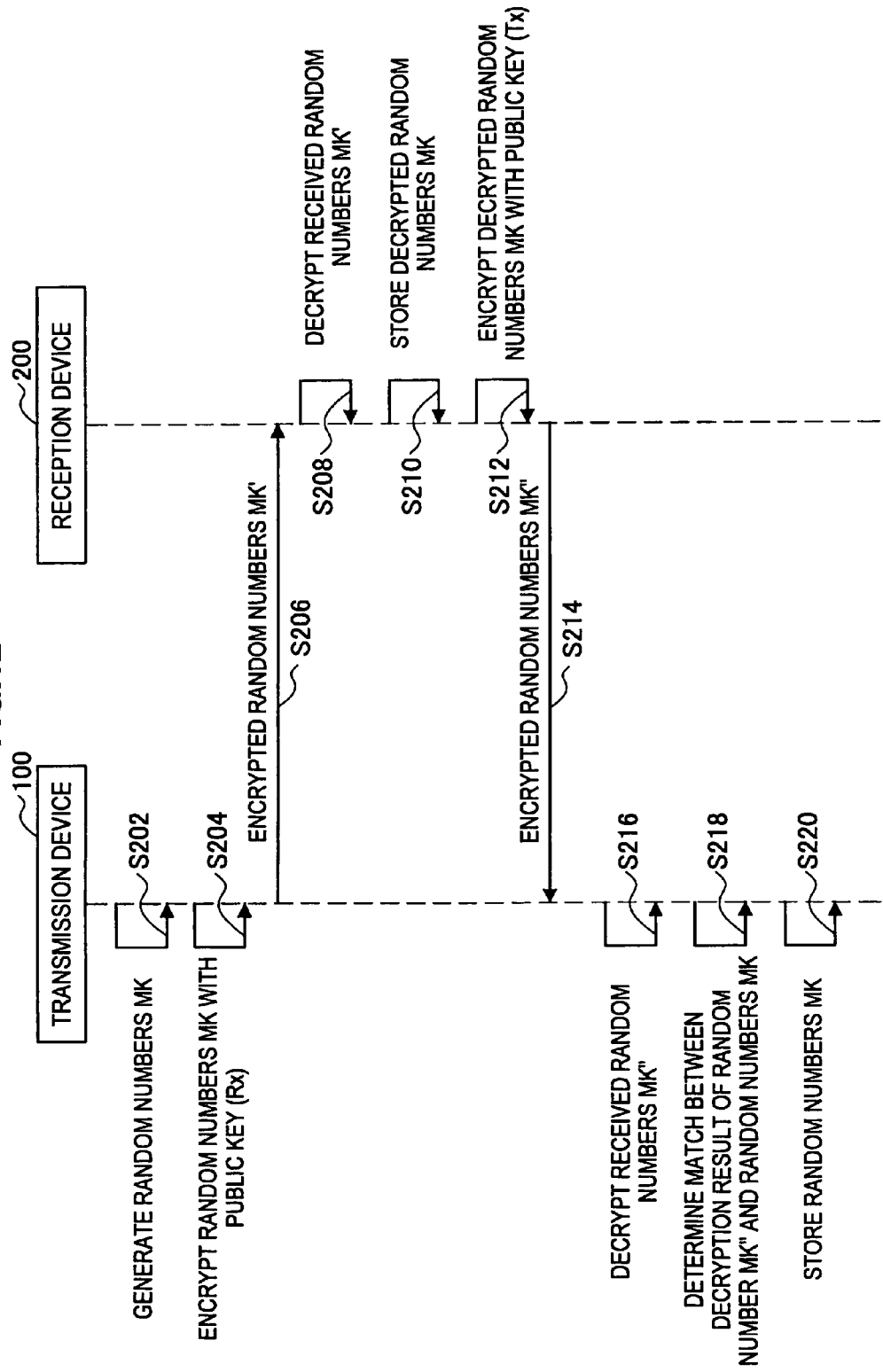

COMMUNICATION DEVICE, COMMUNICATION METHOD AND PROGRAM

CROSS-REFERENCE TO RELATED APPLICATION

The present application claims priority from Japanese Patent Application No. JP 2008-313661 filed in the Japanese Patent Office on Dec. 9, 2008, the entire content of which is incorporated herein by reference.

BACKGROUND OF THE INVENTION

1. Field of the Invention

The present invention relates to a communication device, a communication method and a program.

2. Description of the Related Art

In the past, a variety of communication protocols have been proposed to prevent unauthorized copying of contents to be protected by copyrights and the like. For example, with the high definition multimedia interface (HDMI), transmission data is transmitted from a HDMI terminal after being encrypted by a transmission device for transmitting copy-restricted contents. At that time, the transmission device previously authenticates a reception device in accordance with the high-bandwidth digital content protection (HDCP) and shares a secret key used for encrypting the transmission data in public key cryptography. For example, a technology relating to copy control of contents utilizing the HDCP is disclosed in Japanese Patent Application No. Laid-open 2007-104561.

Recently, in accordance with progression of wireless communication technologies such as a wireless local-area network (LAN), a usage pattern of contents to be available with transmitting content data such as video and music by radio waves to a variety of devices has been practical.

SUMMARY OF THE INVENTION

However, with a communication protocol of HDCP1.x, for example, since authentication information is not inherited when the content data is relayed by radio waves, there is a risk that the content data transmitted by radio waves is copied in an unauthorized manner. Accordingly, in view of emphasizing on content protection, it is desired, for example, to limit pairing to one pair between the transmission device and the reception device so that the contents are not freely used with other devices. On the other hand, in view of users to enjoy contents, it is desired to enable flexible operation for the pairing between the transmission device and the reception device so as to allow replacement of devices, for example, in the event of failure or upgrading.

In light of the foregoing, it is desirable to provide a novel and improved communication device, a communication method and a program which are capable of preventing unrestricted usage of contents while ensuring flexibility of pairing between a transmission device and a reception device.

According to an embodiment of the present invention, there is provided a communication device, including, a communication unit which mediates a communication connection with another communication device, a memory unit which stores connection history information which indicates history of a connection party connected via the communication unit and connection restriction information to limit the number of connection party changes, and a determination unit which determines connection acceptability with a new connection party based on the connection history information and the connection restriction information stored in the memory unit.

The connection restriction information may include an upper limit value of the number of connection party changes so that the determination unit may refuse connection with the new connection party in a case that the number of connection party changes exceeds the upper limit value.

The determination unit may determine connection acceptability without incrementing the number of connection party changes for new connection with the same device as a connection party in the past.

The determination unit may determine connection acceptability after incrementing the number of connection party changes for new connection with the same device as a connection party in the past.

According to another embodiment of the present invention, there is provided a communication method, including the steps of, storing connection restriction information to limit the number of connection party changes previously in a recording medium of a communication device, storing connection history information which indicates connection party history of communication connection with another communication device in a recording medium of the communication device, and determining connection acceptability with a new connection party based on the connection history information and the connection restriction information by the communication device.

According to another embodiment of the present invention, there is provided a program for causing a computer, which controls a communication device including a communication unit which mediates a communication connection with another communication device, to function as, a control unit which stores connection history information which indicates history of a connection party connected via the communication unit in a recording medium, and a determination unit which determines connection acceptability with a new connection party based on the connection history information and connection restriction information to limit the number of connection party changes.

As described above, with the communication device, the communication method and the program according to the present invention, the unrestricted usage of contents can be prevented while ensuring flexibility of pairing between a transmission device and a reception device.

BRIEF DESCRIPTION OF THE DRAWINGS

FIG. 3 is an explanatory view which illustrates an example of connection history information according to an embodiment;

FIG. 4 is an explanatory view which illustrates an example of connection restriction information according to an embodiment;

FIG. 7 is a block diagram which illustrates an example of the configuration of a transmission device according to an embodiment;

FIG. 8 is an explanatory view which illustrates an example of connection restriction information according to an embodiment;

FIG. 12 is a sequence diagram which describes the flow of a mutual authentication process according to an embodiment.

DETAILED DESCRIPTION OF THE EMBODIMENTS

Figure 1:
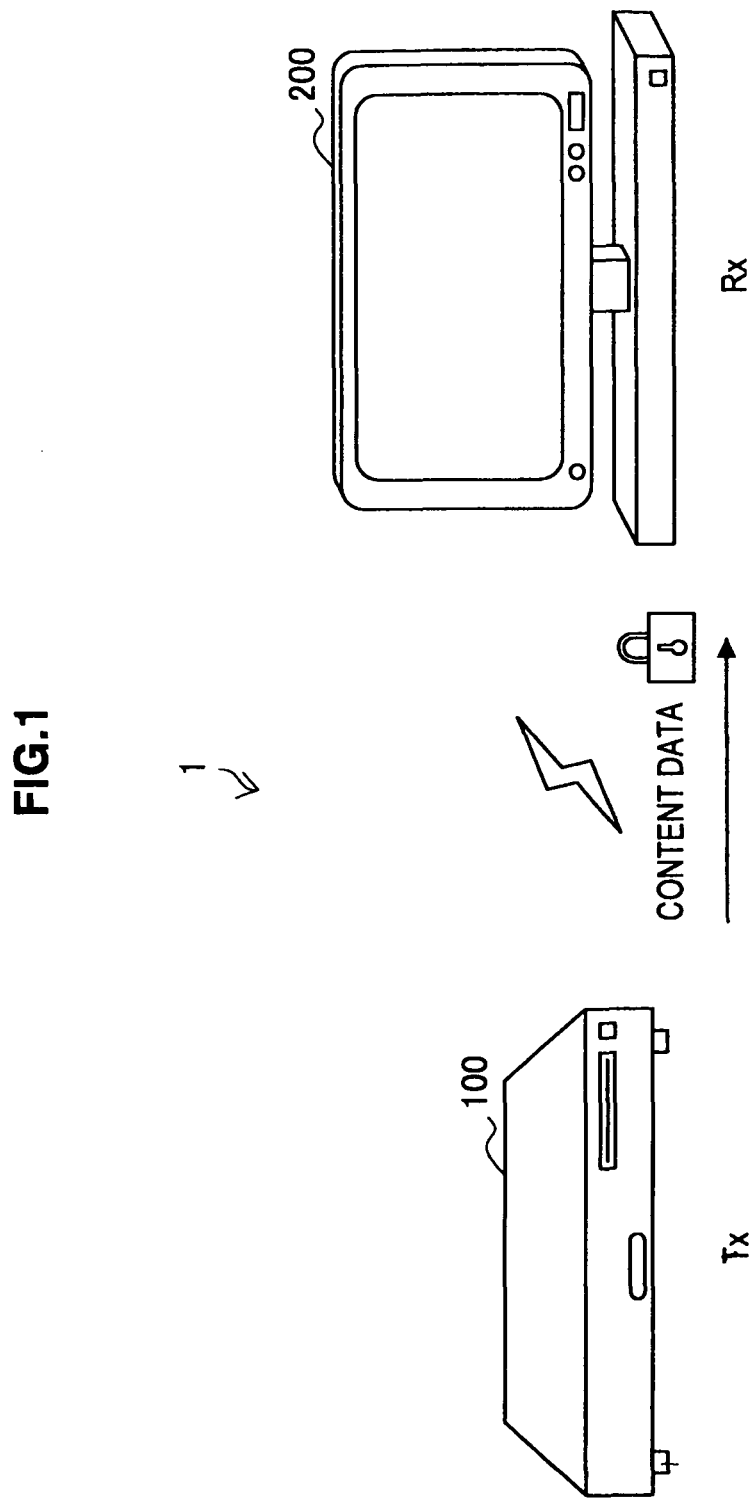
FIG. 1 is a schematic view which schematically illustrates a communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Here, preferred embodiments of the present invention will be described in the following order.

1. Outline of a communication system according to an embodiment

2. Description of a transmission device according to an embodiment

3. Description of a reception device according to an embodiment

4. Flow of communication process according to an embodiment

5. Summary

<1. Outline of Communication System According to an Embodiment>

First, a communication system 1 according to an embodiment of the present invention will be schematically described with reference to FIG. 1.

FIG. 1 is a schematic view which schematically illustrates the communication system 1. As illustrated in FIG. 1, the communication system 1 includes a transmission device 100 and a reception device 200.

The transmission device 100 obtains content data and transmits it to the reception device 200. For example, the transmission device 100 may be a hard disk drive (HDD) recorder, a blu-ray disk (BD: a registered trademark) recorder and the like for storing the content data such as video contents or music contents. In this case, the transmission device 100 transmits to the reception device 200 after reading, for example, from a recording medium in which the content data is stored. Instead, the transmission device 100 may be a tuner and the like which receives and relays a broadcast program, for example.

The reception device 200 receives the content data transmitted from the transmission device 100. For example, the transmission device 100 may be a display device capable of replaying the video contents on a screen such as a cathode ray tube (CRT), a plasma display panel (PDP) or a liquid crystal display. Instead, the reception device 200 may be a music replay device capable of replaying music contents, for example.

The transmission device 100 and the reception device 200 are connected by wireless communication such as Bluetooth (a registered trademark) and wireless LAN, for example. However, the connection pattern between the transmission device 100 and the reception device 200 is not limited to the above. It is also possible that wired communication, for example, with HDMI, wired LAN, ADSL or optical fiber, may be performed between the transmission device 100 and the reception device 200.

With the abovementioned configuration of the communication system 1, for example, with utilizing the reception device 200 installed at an arbitrary position in one's home, the user can enjoy the content data by receiving from the distanced transmission device 100. In this case, in order to prevent unauthorized copying of contents by malicious users, it is desired to limit the number of changes of the pairing (i.e., combination) between the transmission device 100 and the reception device 200. In the present embodiment, the configuration of the transmission device 100 and the reception device 200 which will be specifically described in the following prevent unlimited pairing changes while ensuring flexibility of the pairing between the transmission device 100 and the reception device 200.

<2. Description of Transmission Device According to an Embodiment>

Figure 2:
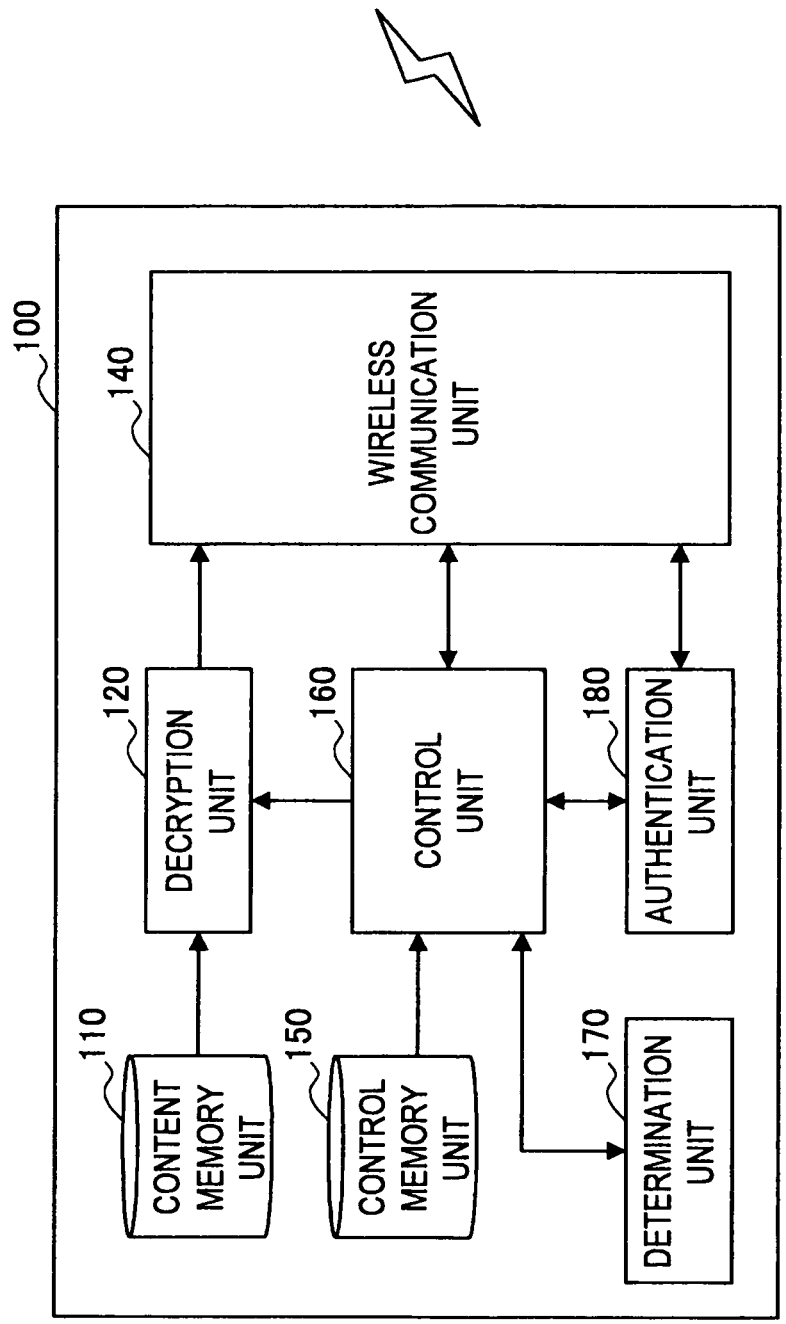
FIG. 2 is a block diagram which illustrates an example of the configuration of a transmission device according to an embodiment.

FIG. 2 is a block diagram which illustrates an example of the configuration of the transmission device 100 according to an embodiment of the present invention. As illustrated in FIG. 2, the transmission device 100 includes a content memory unit 110, a decryption unit 120, a wireless communication unit 140, a control memory unit 150, a control unit 160, a determination unit 170 and an authentication unit 180.

[2-1. Transmission Device—Content Memory Unit]

The content memory unit 110 is configured with a recording medium such as HD, BD or DVD, for example, and stores the content data such as video contents or music contents. The content memory unit 110 outputs given content data to the decryption unit 120 in accordance with an instruction from a user, for example.

[2-2. Transmission Device—Description Unit]

The decryption unit 120 decrypts the content data input from the content memory unit 110 in accordance with a given method of an image coding method or a music coding method. Then, the decryption unit 120 outputs the decrypted content data to the wireless communication unit 140.

[2-3. Transmission Device—Wireless Communication Unit]

The wireless communication unit 140 mediates a communication connection between the transmission device 100 and another communication device. For example, the wireless communication unit 140 transmits the content data input from the decryption unit 120 to the reception device 200 in accordance with the communication method such as UWB, Bluetooth (the registered trademark) or wireless LAN.

Here, in the present embodiment, a communication path between the wireless communication unit 140 and the other communication device is encrypted with a secret key which is shared with the other communication device after being mutually authenticated by the later-mentioned authentication unit 180. Accordingly, in the case that copy-prohibited content data is transmitted from the wireless communication unit 140, for example, only one connection party can acquire the content of the transmitted content data at a time. In this specification, pairing denotes to form one-to-one coupling of the transmission device and the reception device after being mutually authenticated as described above. With such pairing, the transmitted content data is prevented from being obtained in an unauthorized manner such as tapping or the like.

Further, in the present embodiment, the later-mentioned control memory unit 150 stores connection history information which indicates history of the connection parties connected via the wireless communication unit 140. Then, based on the connection history information and preconfigured connection restriction information, the later-mentioned restriction is applied to the communication connection with other communication devices via the wireless communication unit 140.

[2-4. Transmission Device—Control Memory Unit]

The control memory unit 150 stores the connection history information which indicates history of connection parties connected via the wireless communication unit 140 and the connection restriction information to limit the number of changes of the connection parties as control data to be utilized for the communication control between the transmission device 100 and the other communication device. Here, the control memory unit 150 and the above-mentioned content memory unit 110 may be configured as a single recording medium or separate recording media in a physical manner.

FIG. 3 indicates data specifics of the connection history information 152 stored in the control memory unit 150 as an example.

As indicated in FIG. 3, the connection history information 152 includes six data items from the second column through the seventh column for each row specified by the row number in the first column. Here, FIG. 3 indicates three connection histories from row numbers 1 to 3. The data specifics will be respectively described in the following.

The second column of the connection history information 152 indicates a device identifier (ID) for specifying the device of the connection party connected with the wireless communication unit 140 in each connection history. The device ID may be a combination of a manufacturer ID and a unit identification number of each manufacturer, for example. In the example of FIG. 3, the device ID of the connection history of row number 1 (hereinafter, called connection history 1 being the same for other row numbers) is "SO1000". Further, the device ID of connection history 2 is "SO2000" and the device ID of connection history 3 is "NY3000".

The third column of the connection history information 152 indicates a device type for identifying the device type of the connection party in each connection history. In the example of FIG. 3, the device type of connection history 1 is "LCD", the device type of connection history 2 is "OLED" and the device type of connection history is "PDP". Here, the figures of the device types are not limited to such an example. For example, the device types may be figures capable of identifying a replay device, a memory device and a relaying device etc. from each other or may be figures capable of identifying a type etc. of a recording medium of a recording device.

The fourth column of the connection history information 152 indicates a key value of a public key of the device of the connection party in each connection history. In the example of FIG. 3, the key value of connection history 1 is "98765432", the key value of connection history 2 is "87654321" and the key value of connection history 3 is "76543210". This public key is obtained during mutual authentication with each connection party by the later-mentioned authentication unit 180.

The fifth column of the connection history information 152 indicates a key value of a secret key exchanged during the mutual authentication with the device of the connection party in each connection history. For example, the secret key may be a shared secret value in a standard specification of HDCP1.x. In the example of FIG. 3, the shared secret value of connection history 1 is "1357", the shared secret value of connection history 2 is "2468" and the shared secret value of connection history 3 is "3579". The secret key or the shared secret value is used for encrypting the communication path between the wireless communication unit 140 and each connection party.

The sixth column of the connection history information 152 indicates a version of an authentication method capable of being used for the communication with the device of the connection party in each connection history. In the example of FIG. 3, the version of the authentication method of connection history 1 is "HDCP1.0", the version of the authentication method of connection history 2 is "HDCP1.1" and the version of the authentication method of connection history 3 is "HDCP1.2".

The seventh column of the connection history information 152 indicates a registration date when each connection history is registered. In the example of FIG. 3, the registration date of connection history 1 is "2008/1/10", the registration date of connection history 2 is "2008/5/5" and the registration date of connection history 3 is "2008/9/1".

Next, FIG. 4 indicates data specifics of the connection restriction information 154 which is previously stored in the control memory unit 150 as an example.

As indicated in FIG. 4, the connection restriction information 154 includes two data items of the number of allowable connections and reconnection count-up. The number of allowable connections indicates the total number of connection parties which are allowed to be connected with the wireless communication unit 140. Namely, assuming that the first pairing is treated as the first connection party change, for example, the number of allowable connections corresponds to the upper limit value of the connection party changes of the communication connection. Meanwhile, the reconnection count-up indicates whether or not incrementing is performed to the total number of connections which is to be compared to the number of allowable connections in the case that communication connection is newly established with the same device as a connection party which had been connected in the past. That is, for example, the reconnection count-up can be defined so that the incrementing is to be performed when the figure is "Y" and the incrementing is not to be performed when the figure is "N".

In the following, the description on the example of the configuration of the transmission device 100 is continued with reference to FIG. 2.

[2-5. Transmission Device—Control Unit]

The control unit 160 controls operation of each unit of the transmission device 100 of FIG. 2 with utilizing a processing unit such as a central processing unit (CPU). For example, the control unit 160 instructs the decryption unit 120 to perform obtaining and decrypting of the content data from the content memory unit 110 in accordance with an instruction from a user. Further, for example, the control unit 160 instructs the determination unit 170 to determine connection acceptability prior to the communication connection between the wireless communication unit 140 and the other communication device and instructs the authentication unit 180 to perform the mutual authentication. Furthermore, the control unit 160 appends a new connection history to the connection history information 152 in the control memory unit 150 when the communication connection is established between the wireless communication unit 140 and the other communication device.

[2-6. Transmission Device—Determination Unit]

The determination unit 170 determines the connection acceptability with a new connection party via the wireless communication unit 140 based on the connection history information 152 and the connection restriction information 154 stored in the control memory unit 150 which have been described with reference to FIG. 3 and FIG. 4.

Figure 5:
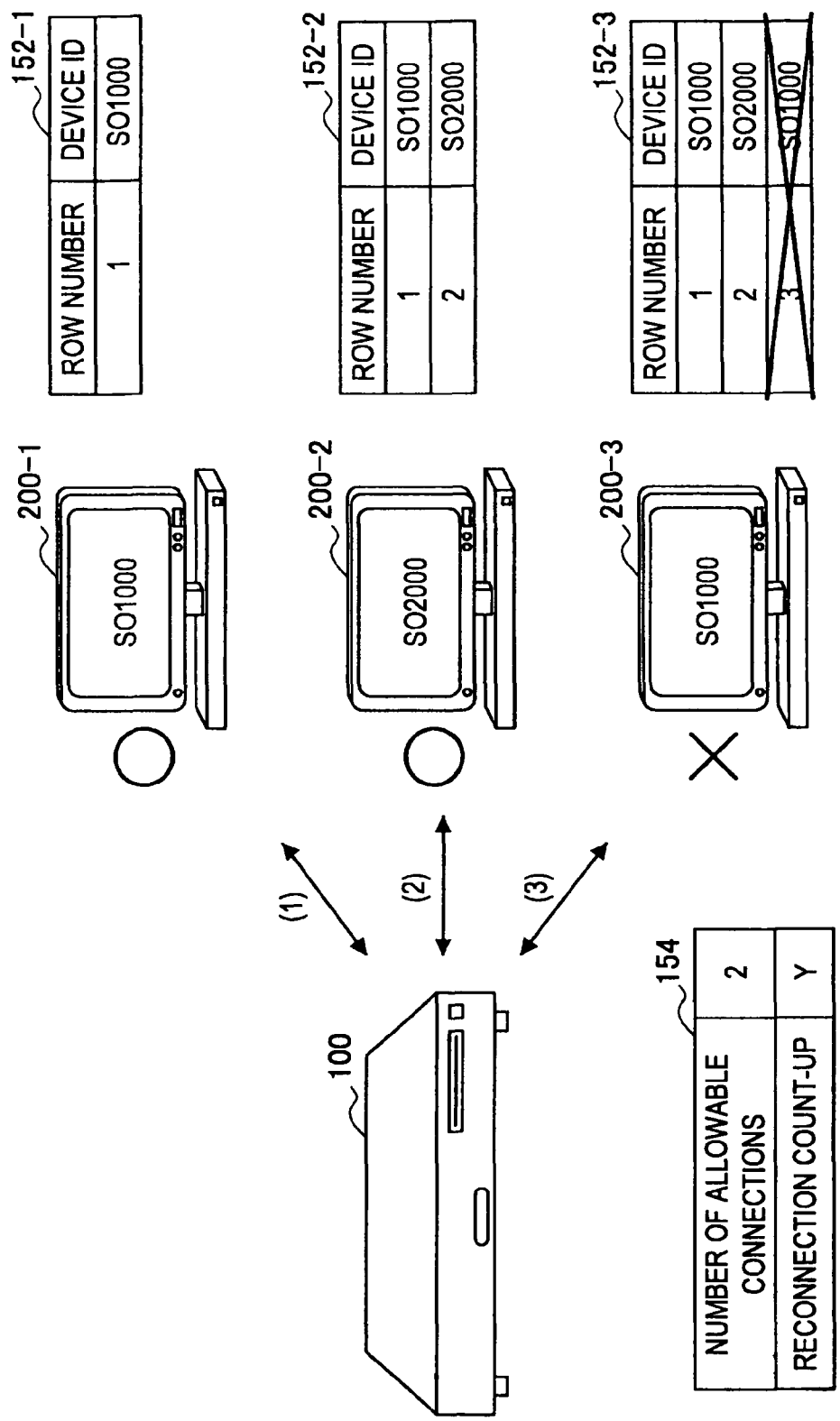
FIG. 5 is an explanatory view which illustrates an example of a determination process of connection acceptability based on the connection restriction information of FIG. 4.

FIG. 5 is an explanatory view which illustrates an example of a determination process of the connection acceptability based on the connection restriction information 154 of FIG. 4.

As illustrated in FIG. 5, the transmission device 100 is connected with the reception device 200-1 of which device ID is "SO1000" as arrow (1) via the wireless communication unit 140. In the connection history until this time, the total number of connections connected via the wireless communication unit 140 is one and does not exceed two which is the number of allowable connections of the connection restriction information 154. Therefore, the determination unit 170 allows the connection with the reception device 200-1. Then, connection history 1 of the device ID "SO1000" is registered to the connection history information 152 in the control memory unit 150 as indicated by 152-1. Here, the data items other than the row number and the device ID among the data items of the connection history information 152 are omitted from FIG. 5.

Next, the transmission device 100 attempts to change the connection party to the reception device 200-2 of which device ID is "SO2000" as arrow (2) via the wireless communication unit 140. In the connection history until this time, the total number of connections with the transmission device 100 connected via the wireless communication unit 140 is two and does not exceed two which is the number of allowable connections of the connection restriction information 154. Therefore, the determination unit 170 allows the change of the connection parties from the reception device 200-1 to the reception device 200-2. Accordingly, for example, the user can replace the failed reception device 200-1 with the reception device 200-2 or upgrade to the reception device 200-2 of higher performance from the reception device 200-1.

Next, the transmission device 100 tries to change the connection party to the reception device 200-3 of which device ID is "SO1000" as arrow (3) via the wireless communication unit 140. Here, the device ID "SO1000" is matched with the device ID of connection history 1. Namely, the user is attempting to reconnect the transmission device 100 with the reception device 200-1 which had been connected in the past. In the example of FIG. 5, the reconnection count-up of the connection restriction information 154 is "Y". Therefore, even with the same device as the past connection party, the number of connection party changes is incremented at the time of reconnecting and the total number of connections becomes three. In this case, since the total number of connections exceeds two which is the number of allowable connections, the determination unit 170 refuses the change of the connection parties from the reception device 200-2 to the reception device 200-3.

Typically, as for the connection party changes (i.e., changes of the reception devices) in the transmission device 100, it is preferable to determine the connection acceptability after incrementing the number of connection party changes even in the case of reconnecting with the past connection party as illustrated in FIG. 5. Accordingly, the contents stored in the transmission device can be prevented from being copied in numbers in an unauthorized manner by malicious users while simply changing the reception devices.

Here, the value of the total number of connections (or the number of connection party changes) may be permanently stored in the control memory unit 150, for example. In that case, the value is updated on each connecting with a new connection party. Instead, the value of the total number of connections (or the number of connection party changes) may be calculated through the connection history information 152 each time connection with a new connection party is attempted.

An example of a determination process of connection acceptability in the case that the reconnection count-up is "N" is mentioned later in the description about the reception device 200.

[2-7. Transmission Device—Authentication Unit]

The authentication unit 180 performs the mutual authentication with the other communication device connected via the wireless communication unit 140 by utilizing the control device commonly used for the control unit 160 or a dedicated control device. For example, the mutual authentication process by the authentication unit 180 may comply with mutual authentication sequence in the standard specification of HDC1.x. In that case, the authentication unit 180 performs, for example, generating and encrypting of random numbers, transmitting of the encrypted random numbers, decrypting of the returned random numbers, comparing between the decrypted random numbers and the originally generated random numbers, and the like. The flow of the mutual authentication process between the transmission device 100 and the reception device 200 performed by the authentication unit 180 will be described later in detail with reference to a sequence diagram.

Up to this point, the configuration of the transmission device 100 according to the present embodiment has been described with reference to FIGS. 2 to 5. In the example of FIGS. 2 to 5, functional elements of storing the content data and functional elements of performing wireless communication are integrally arranged into the transmission device 100. However, for example, it is also possible that the functional elements of storing the content data and functional elements of performing wireless communication are arranged to be divided into physically separated devices, as illustrated in FIG. 6.

[2-8. Modified Example of Transmission Device]

Figure 6:
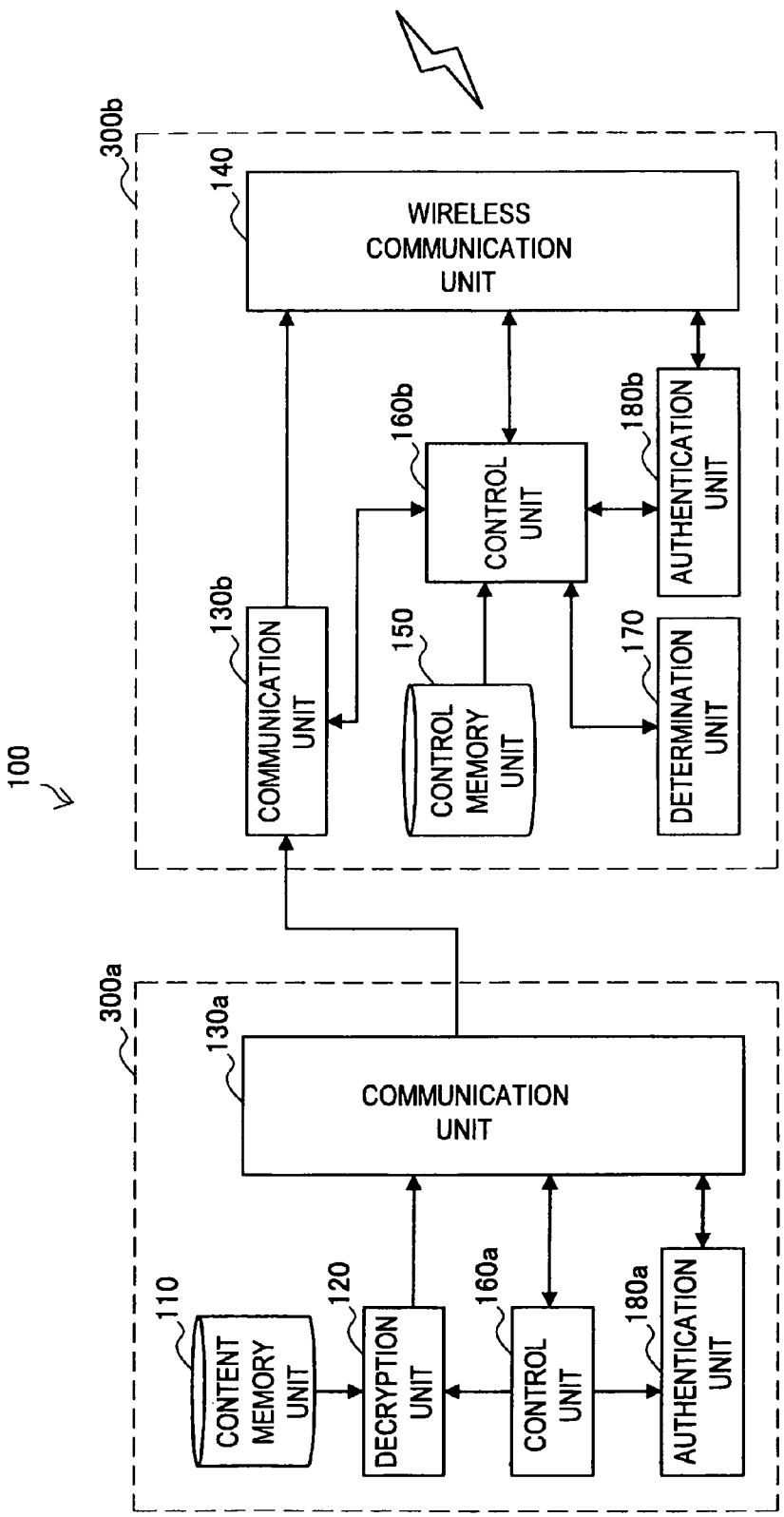
FIG. 6 is a block diagram which illustrates a modified example of the configuration of the transmission device.

FIG. 6 is a block diagram which illustrates the configuration of a modified example of the transmission device 100.

As illustrated in FIG. 6, the transmission device 100 includes a memory device 300a and a relay device 300b which are arranged separately. The memory device 300a is provided with the content memory unit 110, the decryption unit 120, a communication unit 130a, a control unit 160a and an authentication unit 180a. Meanwhile, the relay device 300b is provided with a communication unit 130b, the wireless communication unit 140, the control memory unit 150, a control unit 160b, the determination unit 170 and an authentication unit 180b.

The communication unit 130a of the memory device 300a transmits the content data input from the decryption unit 120 to the relay device 300b, for example, in accordance with a communication method such as HDMI, wired LAN, ADSL and optical fiber. At that time, the communication path between the communication unit 130a and the relay device 300b is encrypted through the mutual authentication by the authentication unit 180a. Thus, it is prevented that third parties obtain the contents in an unauthorized manner by tapping the data transmitted from the communication unit 130a to the relay device 300b.

The control unit 160a of the memory device 300a controls operation of each unit of the memory device 300a of FIG. 6 with utilizing a processing unit such as a CPU. For example, the control unit 160a instructs the decryption unit 120 to perform obtaining and decrypting the content data from the content memory unit 110 in accordance with an instruction of the user. Further, for example, the control unit 160a instructs the authentication unit 180a to perform the mutual authentication prior to the communication connection between the communication unit 130a and the relay device 300b.

The authentication unit 180a of the memory device 300a performs the mutual authentication with the relay device 300b which is connected via the communication unit 130a. For example, the mutual authentication process by the authentication unit 180a may follow the mutual authentication sequence in the standard specification of HDC1.x.

Meanwhile, for example, the communication unit 130b of the relay device 300b outputs the content data received from the communication unit 130a of the memory device 300a to the wireless communication unit 140. Then, the wireless communication unit 140 relays received content data to the other wireless communication device.

The control unit 160b of the relay device 300b controls operation of each unit of the relay device 300b of FIG. 8 with utilizing a processing unit such as a CPU. For example, the control unit 160b instructs the determination unit 170 to determine connection acceptability prior to the communication connection between the wireless communication unit 140 and the other communication device and instructs the authentication unit 180b to perform the mutual authentication. Further, the control unit 160b appends a new connection history to the connection history information 152 in the control memory unit 150 when the communication connection is established between the wireless communication unit 140 and the other communication device.

The authentication unit 180b of the relay device 300b performs the mutual authentication with the other communication device connected via the wireless communication unit 140. For example, the mutual authentication process by the authentication unit 180b may follow the mutual authentication sequence in the standard specification of HDC1.x.

Up to this point, an example and a modified example of the configuration of the transmission device 100 have been described. Next, the reception device 200 according to an embodiment will be described.

<3. Description of Reception Device According to an Embodiment>

FIG. 7 is a block diagram which illustrates an example of the configuration of the reception device 200 according to an embodiment of the present invention. As illustrated in FIG. 7, the reception device 200 includes a wireless communication unit 210, a replay unit 230, a control memory unit 250, a control unit 260, a determination unit 270 and an authentication unit 280.

[3-1. Reception Device—Wireless Communication Unit]

The wireless communication unit 210 mediates a communication connection between the reception device 200 and another communication device. For example, the wireless communication unit 210 receives the content data transmitted from the transmission device 100 in accordance with the communication method such as UWB, Bluetooth (the registered trademark) and wireless LAN and outputs to the replay unit 230.

Here, in the present embodiment, the communication path between the wireless communication unit 140 of the transmission device 100 and the wireless communication unit 210 of the reception device 200 is encrypted with a secret key which is shared through the mutual authentication. Thus, it is prevented that third parties obtain the content data transmitted from the transmission device 100 to the reception device 200 in an unauthorized manner by tapping and the like.

Further, in the present embodiment, the later-mentioned control memory unit 250 stores the connection history information which indicates the history of the connection parties connected via the wireless communication unit 210. Then, based on the connection history information and previously assigned connection restriction information, the later-mentioned restriction is applied to the communication connection with the other communication device via the wireless communication unit 210.

The connection between the reception device 200 and the other communication device is not necessarily performed with wireless communication. Namely, it is also possible that wired communication, for example, with HDMI, wired LAN, ADSL or optical fiber, is performed between the reception device 200 and the other device.

[3-2. Reception Device—Replay Unit]

The replay unit 230 replays the content data of video contents input from the wireless communication unit 210 with a display device, for example, such as a cathode ray tube (CRT), a liquid crystal display and an organic light emitting diode (OLED). Instead, the replay unit 230 may replay the content data of music contents input from the wireless communication unit 210 with an audio output device such as a speaker, for example.

[3-3. Reception Device—Control Memory Unit]

The control memory unit 250 stores the connection history information which indicates the history of connection parties connected via the wireless communication unit 210 and the connection restriction information to limit the number of connection party changes as control data utilized for the communication control between the reception device 200 and the other communication device.

The connection history information stored in the control memory unit 250 includes similar data items to the connection history information 152 of FIG. 3, for example.

FIG. 8 indicates data specifics of connection restriction information 254 which is previously stored in the control memory unit 250 as an example.

As indicated in FIG. 8, similar to the connection restriction information 154 of FIG. 4, the connection restriction information 254 includes two data items of the number of allowable connections and the reconnection count-up. Here, the figure of the reconnection count-up is stored to be "N" in the control memory unit 250. Accordingly, in the present embodiment, the total number of connections which is to be compared to the number of allowable connections is not incremented in the case that the communication connection is newly performed between the reception device 200 and the same device as a past connection party.

In the following, the description on the example of the reception device 200 is continued with reference to FIG. 7.

[3-4. Reception Device—Control Unit]

The control unit 260 controls operation of each unit of the reception device 200 of FIG. 7 with utilizing a processing unit such as a CPU. For example, the control unit 260 instructs the determination unit 270 to determine connection acceptability prior to the communication connection between the wireless communication unit 210 and the other communication device and instructs the authentication unit 280 to perform the mutual authentication. Further, the control unit 260 appends a new connection history to the connection history information in the control memory unit 250 when the communication connection is established between the wireless communication unit 210 and the other communication device.

[3-5. Reception Device—Determination Unit]

The determination unit 270 determines the connection acceptability with a new connection party via the wireless communication unit 210 based on the connection history information and the connection restriction information stored in the control memory unit 250.

Figure 9:
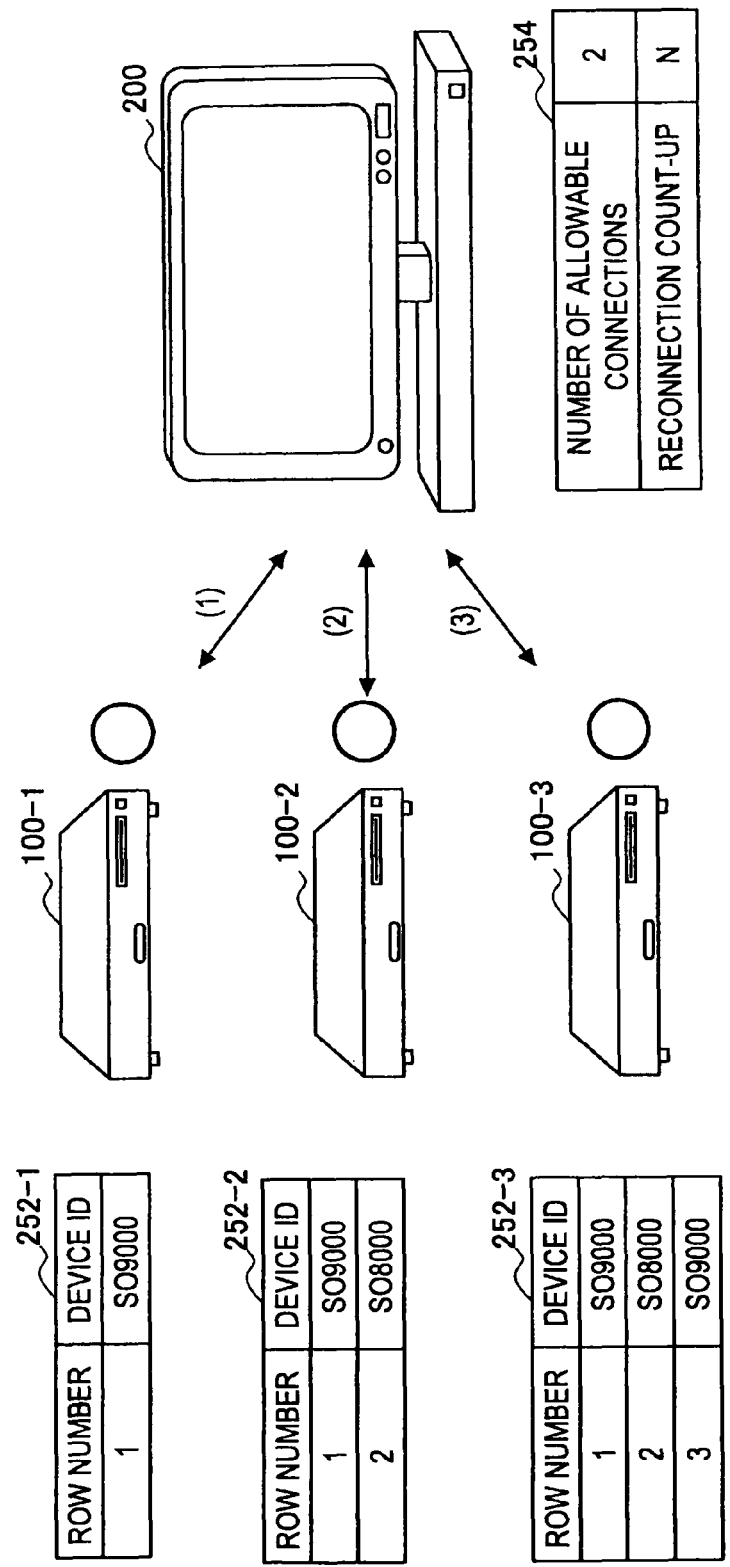
FIG. 9 is an explanatory view which illustrates an example of a determination process of connection acceptability based on the connection restriction information of FIG. 8.

FIG. 9 is an explanatory view which illustrates an example of a determination process of the connection acceptability based on the connection restriction information 254 of FIG. 8.

As illustrated in FIG. 9, the reception device 200 is connected with the transmission device 100-1 of which device ID is "SO9000" as arrow (1) via the wireless communication unit 210. In the connection history by thus time, the total number of connections connected via the wireless communication unit 210 is one and does not exceed two which is the number of allowable connections of the connection restriction information 254. Therefore, the determination unit 270 allows the connection with the transmission device 100-1. Then, connection history 1 of the device ID "SO9000" is registered to the connection history information 252 in the control memory unit 250 as indicated by 252-1. Here, the data items other than the row number and the device ID among the data items of the connection history information are omitted from FIG. 9.

Next, the reception device 200 attempts to change the connection party to the transmission device 100-2 of which device ID is "SO8000" as arrow (2) via the wireless communication unit 210. In the connection history until this time, the total number of connections with the reception device 200 connected via the wireless communication unit 210 is two and does not exceed two which is the number of allowable connections of the connection restriction information 254. Therefore, the determination unit 270 allows the change of the connection parties from the transmission device 100-1 to the transmission device 100-2. Accordingly, for example, the user can replace the failed transmission device 100-1 with the transmission device 100-2 or upgrade to the transmission device 100-2 having a higher version than the transmission device 100-1.

Next, the reception device 200 attempts to change the connection party to the transmission device 100-3 of which device ID is "SO9000" as arrow (3) via the wireless communication unit 210. Here, the device ID "SO9000" is matched with the device ID of connection history 1. Namely, the user is attempting to reconnect the reception device 200 with the transmission device 100-1 which had been connected in the past. In the example of FIG. 9, the reconnection count-up of the connection restriction information 254 is "N". Therefore, the number of connection party changes is not incremented at the time of reconnecting with the same device as the past connection party. Namely, the total number of connections remains at two, so that the total number of connections does not exceed two which is the number of allowable connections. Accordingly, the determination unit 270 allows the change of the connection parties from the transmission device 100-2 to the transmission device 100-3.

Normally, the device of the destination of the content data is not to be changed in case of the change of the connection parties (i.e., the change of the transmission devices) of the reception device 200. Therefore, the possibility to cause an issue of unauthorized copying and the like of the contents is small even though the change of the connection parties is allowed freely to some extent. Hence, as illustrated in FIG. 9, it is preferable for the reception device 200 to determine the connection acceptability without incrementing the number of connection party changes in the case of reconnecting with the past connection party.

Here, similar to the description relating to the control memory unit 150 of the transmission device 100, the value of the total number of connections (or the number of connection party changes) may be stored in the control memory unit 250 or calculated through the connection history information respectively.

[3-6. Reception Device—Authentication Unit]

The authentication unit 280 performs the mutual authentication with the other communication device connected via the wireless communication unit 210 by utilizing the control device commonly used for the control unit 260 or a dedicated control device. For example, the mutual authentication process by the authentication unit 280 may follow the mutual authentication sequence in the standard specification of HDC1.x.

Up to this point, the configuration of the reception device 200 according to the present embodiment has been described with reference to FIGS. 7 to 9. In the example described of FIGS. 7 to 9, functional elements of replaying the contents and functional elements of performing wireless communication are integrally arranged into the reception device 200. However, for example, it is also possible that the functional elements of replaying the contents and functional elements of performing wireless communication are arranged to be divided into physically separated devices, as illustrated in FIG. 10.

[3-7. Modified Example of Reception Device]

Figure 10:
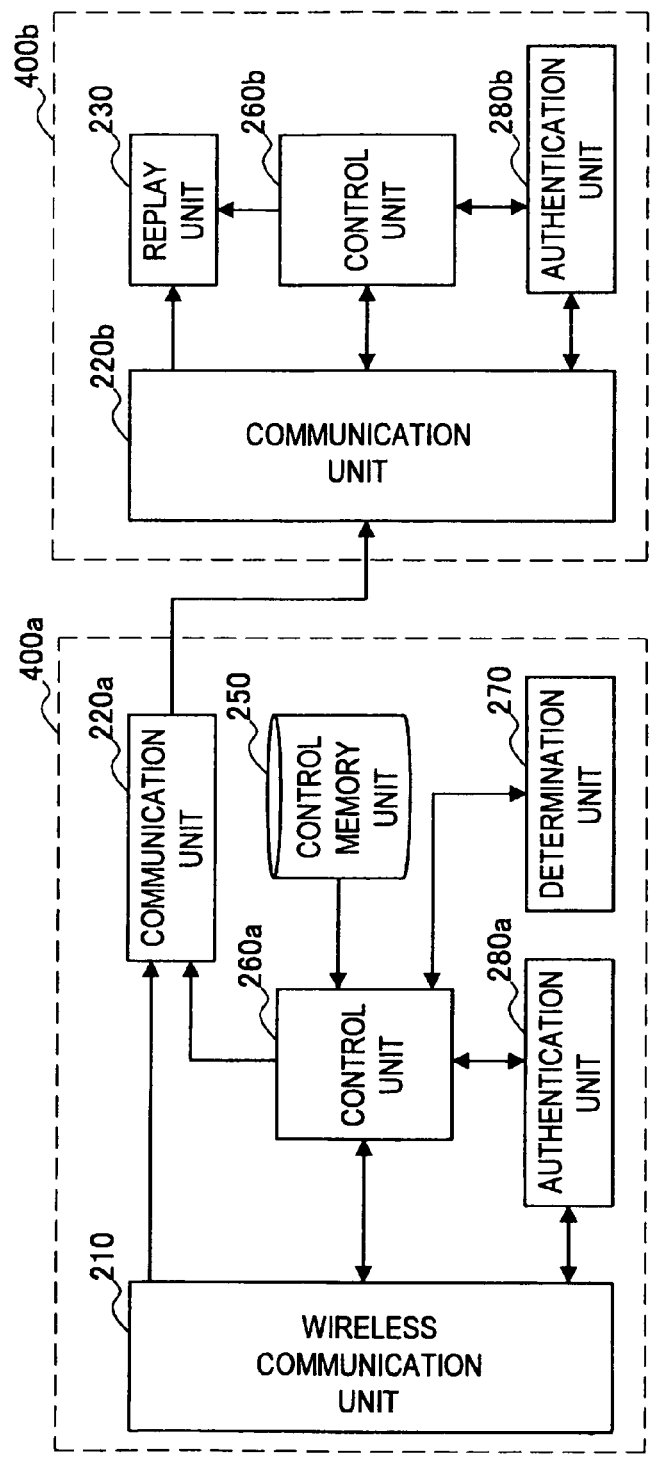
FIG. 10 is a block diagram which illustrates a modified example of the configuration of the reception device.

FIG. 10 is a block diagram which illustrates the configuration of a modified example of the reception device 200.

As illustrated in FIG. 10, the reception device 200 includes a relay device 400a and a replay device 400b which are arranged separately. The relay device 400a is provided with the wireless communication unit 210, a communication unit 220a, the control memory unit 250, a control unit 260a, the determination unit 270 and an authentication unit 280a. Meanwhile, the replay device 400b is provided with a communication unit 220b, the replay unit 230, a control unit 260b and an authentication unit 280b.

For example, the communication unit 220a of the relay device 400a transmits the content data input from the wireless communication unit 210, to the replay device 400b in accordance with a given communication method. At that time, the communication path between the communication unit 220a and the replay device 400b is encrypted through the mutual authentication by the authentication unit 280a, for example. Thus, it is prevented that third parties obtain the contents in an unauthorized manner by tapping the data transmitted from the communication unit 220a to the replay device 400b.

The control unit 260a of the relay device 400a controls operation of each unit of the relay device 400a of FIG. 10 with utilizing a processing unit such as a CPU. For example, the control unit 260a controls relay of the content data from the wireless communication unit 210 to the communication unit 220a. Further, for example, the control unit 260a instructs the determination unit 270 to determine the connection acceptability prior to the communication connection between the wireless communication unit 210 and the other communication device and instructs the authentication unit 280a to perform the mutual authentication. Furthermore, the control unit 260a appends a new connection history to the connection history information in the control memory unit 250 when the communication connection is established between the wireless communication unit 210 and the other communication device.

The authentication unit 280a of the relay device 400a performs the mutual authentication with the other communication device connected via the wireless communication unit 210. Further, the authentication unit 280a performs the mutual authentication with the replay device 400b connected via the communication unit 220a.

Meanwhile, the communication unit 220b of the replay device 400b outputs the content data received from the communication unit 220a of the relay device 400a to the replay unit 230, for example.

The control unit 260b of the replay device 400b controls operation of each unit of the replay device 400b of FIG. 10 with utilizing a processing unit such as a CPU. For example, when the content data is input from the communication unit 220b to the replay unit 230, the control unit 260b instructs the replay unit 230 to replay the contents.

The authentication unit 280b of the replay device 400b performs the mutual authentication with the relay device 400a connected via the communication unit 220b.

Up to this point, an example and a modified example of the configuration of the reception device 200 have been described. The flow of the communication start process of the communication system 1 according to an embodiment will be described in the following.

<4. Flow of the Communication Start Process According to an Embodiment>

Figure 11:
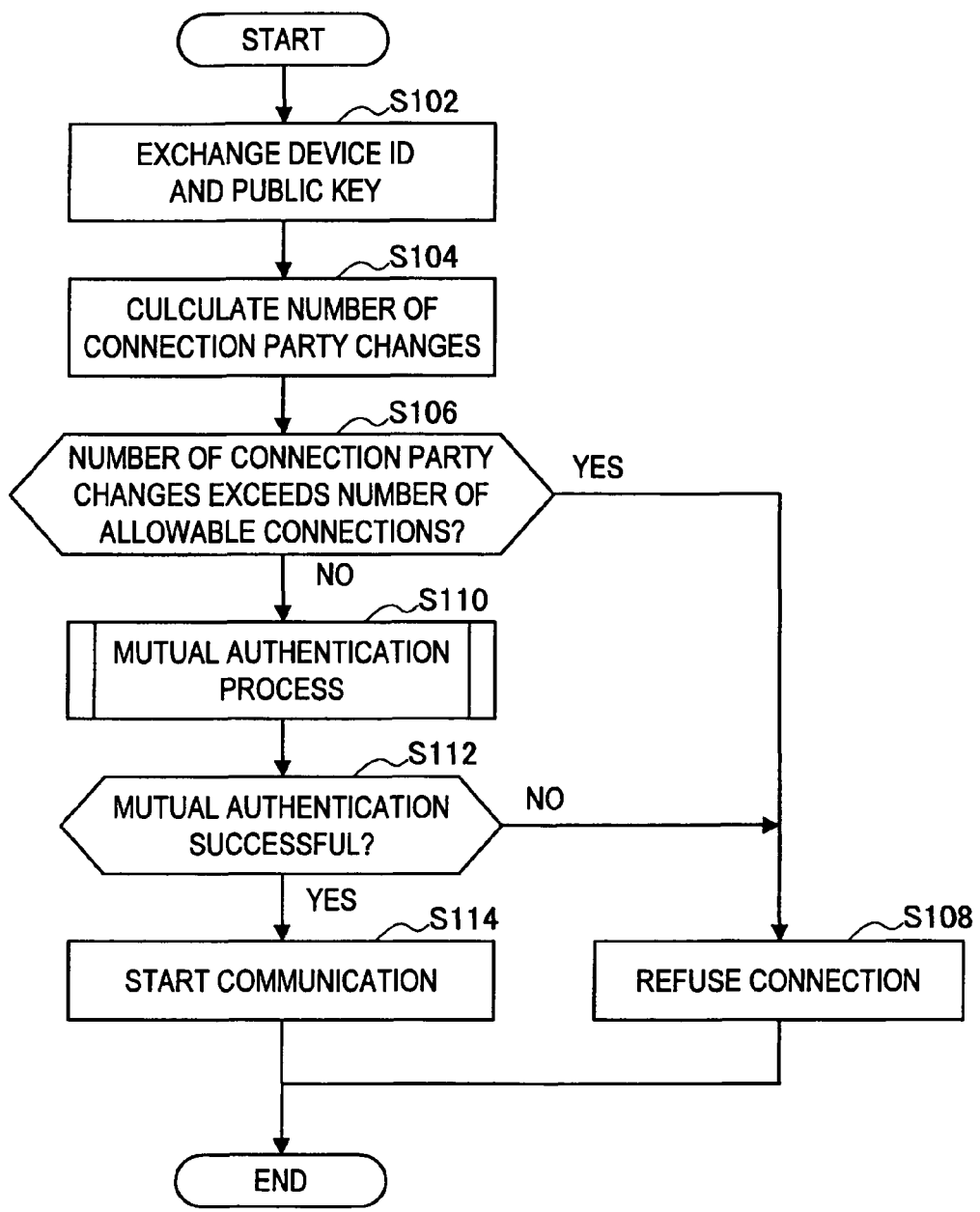
FIG. 11 is a flowchart which describes the flow of a communication start process according to an embodiment.

FIG. 11 is a flowchart which describes the flow of a communication start process of the communication system 1 according to an embodiment of the present invention.

As described in FIG. 11, first, the device ID and the public key are exchanged between the transmission device 100 and the reception device 200 (S102). That is, for example, the device ID and the public key of the transmission device 100 are transmitted from the transmission device 100 to the reception device 200, and then, the device ID and the public key of the reception device 200 are returned from the reception device 200 to the transmission device 100. Then, the exchanged device ID and public key are stored, for example, respectively in the control memory unit 150 of the transmission device 100 and the control memory unit 250 of the reception device 200.

Next, the number of connection party changes is calculated in the transmission device 100 or the reception device 200 (S104). For example, the connection history information and the connection restriction information which are stored in the control memory unit 150 are obtained by the determination unit 170 of the transmission device 100. Then, the number of connection party changes is calculated from the connection history information. At that time, in the case that the reconnection count-up included in the connection restriction information is "Y", for example, the number of changes is incremented by one for a whole of the plural connection histories of which device IDs are the same. On the other hand, in the case that the reconnection count-up is "N", the number of changes is incremented by only one in total for the plural connection histories of which device IDs are the same.

Next, it is determined whether or not the number of connection party changes exceeds the number of allowable connections in the transmission device 100 or the reception device 200 (S106). For example, the determination unit 170 of the transmission device 100 compares the number of connection party changes calculated in S104 with the number of allowable connections included in the connection restriction information obtained from the control memory unit 150. In the case that the number of connection party changes exceeds the number of allowable connections, the process proceeds to S108. On the other hand, in the case that the number of connection party changes does not exceed the number of allowable connections, the process proceeds to S110.

Here, the processes from S104 through S106 may be performed by either of the determination unit 170 of the transmission device 100 and the determination unit 270 of the reception device 200. Instead, these processes may be performed by both of the determination unit 170 of the transmission device 100 and the determination unit 270 of the reception device 200.

In S108, the connection between the transmission device 100 and the reception device 200 is refused since the number of connection party changes exceeds the number of allowable connections (S108).

On the other hand, in S110, the mutual authentication process is performed between the authentication unit 180 of the transmission device 100 and the authentication unit 280 of the reception device 200 (S110).

FIG. 12 is a sequence diagram which describes an example of the flow of the mutual authentication process between the transmission device 100 and the reception device 200. Here, the example is described so that the transmission device 100 starts the mutual authentication. However, not limited to this, the reception device 200 may start the mutual authentication.

As described in FIG. 12, first, random numbers MK are generated by the authentication unit 180 of the transmission device 100 (S202). Then, the generated random numbers MK are encrypted by the authentication unit 180 with utilizing the public key which is received from the reception device 200 (S204). Further, the encrypted random numbers MK' are transmitted to the reception device 200 (S206).

Next, the received random numbers MK' are decrypted by the authentication unit 280 of the reception device 200 (S208). Then, the decrypted random numbers MK are stored, for example, in the control memory unit 250 of the reception device 200 (S210). Subsequently, the decrypted random numbers MK are encrypted by the authentication unit 280 of the reception device 200 with utilizing the public key which is transmitted from the transmission device 100 (S212). Further, the encrypted random numbers MK" are returned to the transmission device 100 (S214).

Next, the received random numbers MK" are decrypted by the authentication unit 180 of the transmission device 100 (S216). Then, it is determined whether or not the decryption result of the random numbers MK" is matched with the random numbers MK generated by the authentication unit 180 in S202 (S218). Here, when both of the random numbers are matched, the mutual authentication is to be successful and the random numbers MK are stored (S220). On the other hand, when both of the random numbers are not matched, the mutual authentication is to be unsuccessful.

As illustrated in FIG. 11, when the mutual authentication between the authentication unit 180 of the transmission device 100 and the authentication unit 280 of the reception device 200 is successful in S110, the communication between the transmission device 100 and the reception device 200 is started (S114). On the other hand, when the mutual authentication is unsuccessful, the connection between the transmission device 100 and the reception device 200 is refused (S108). Thus, the communication start process between the transmission device 100 and the reception device 200 of the communication system 1 is ended.

<5. Summary>

Up to this point, the communication system 1 according to an embodiment of the present invention and the transmission device 100 and the reception device 200 which are included in the communication system 1 have been described with reference to FIGS. 1 to 12.

With the present embodiment, the determination unit 170 can determine, at the transmission device 100 (or the relay device 300b), the connection acceptability with a new connection party based on the connection history information which indicates the history of the connection parties and the connection restriction information to limit the number of connection party changes which are stored in the control memory unit 150. Further, the determination unit 270 can determine, at the reception device 200 (or the relay device 400*a*), the connection acceptability with a new connection party based on the connection history information which indicates the history of the connection parties and the connection restriction information to limit the number of connection party changes which are stored in the control memory unit 250. In this manner, the restriction of pairing between a transmission device and a reception device can be flexibly defined while considering viewpoints of protecting copyrights and user's convenience.

Here, the series of processes by the transmission device 100 or the reception device 200 according to the embodiment described in this specification may be executed with hardware or software. In the case that all of or a part of processes are executed with software, for example, a program constituting the software is stored in a recording medium which is mounted in a computer and executed by a CPU after being read into a random access memory (RAM) at the time of execution.

It should be understood by those skilled in the art that various modifications, combinations, sub-combinations and alterations may occur depending on design requirements and other factors insofar as they are within the scope of the appended claims or the equivalents thereof.

For example, the communication start process described with reference to FIG. 11 and FIG. 12 may not always be performed in the order described in the flowchart and the sequence diagram. Each process step may include a process which is independently performed in parallel or separately.

What is claimed is:

1. A communication device, comprising:
 a communication unit which mediates a communication connection with another communication device;
 a memory unit which stores connection history information which indicates a connection pairing history of a connection party connected via the communication unit and connection restriction information to limit the number of connection party pairings, the connection restriction information including an upper limit value of the total number of connection pairings allowed to the communication device at a given time and a parameter indicating whether a new connection attempt should be included in the total number of connections based on whether the new connection attempt is for a device of a connection party that had previously paired with the communication device;
 a determination unit which determines connection pairing acceptability with a new connection party based on the connection history information and the connection restriction information stored in the memory unit; and
 a control unit coupled to the communication, memory and determination units, the control unit configured to execute programmable instructions that cause the determination unit to determine connection acceptability and to append new connection history information to the connection history information stored in the memory unit
 wherein the determination unit refuses connection with the new connection party in a case that the number of connection party changes pairings exceeds the upper limit value.

2. The communication device according to claim 1, wherein the determination unit determines connection acceptability without incrementing the parameter if the connection party pairings is for new connection with the same device of a connection party in the past.

3. The communication device according to claim 1, wherein the determination unit determines connection acceptability after incrementing the parameter if the number of connection party pairings is for new connection with the same device as a connection party in the past.

4. A communication method, comprising the steps of:
 storing, in a recording medium of a communication device, connection restriction information to limit the number of connection party pairings allowed by a connection party;
 storing, in the recording medium, connection history information which indicates a connection pairing history of communication connections between the communication device and another communication device, the connection restriction information including an upper limit value of the total number of pairings allowed with the communication device at a given time and a parameter indicating whether a new connection attempt should be included in the total number of connections based on whether the new connection attempt is for a device of a connection party that had previously paired with the communication device; and
 determining connection acceptability pairing with a new connection party based on the connection history information and the connection restriction information by the communication device;
 wherein the determination unit refuses connection with the new connection party in a case that the number of connection party changes pairings exceeds the upper limit value.

\* \* \* \* \*